United States Patent Office 3,790,580
Patented Feb. 5, 1974

3,790,580
BIS-4-OXO-4H-1-BENZOPYRANS
Peter Bennett Johnson and Thomas Brian Lee, Loughborough, England, assignors to Fisons Limited, London, England
No Drawing. Filed Sept. 2, 1971, Ser. No. 177,510
Claims priority, application Great Britain, Sept. 3, 1970, 42,132/70, 42,133/70
Int. Cl. C07d 7/32
U.S. Cl. 260—293.58                8 Claims

ABSTRACT OF THE DISCLOSURE

There are described compounds of Formula I,

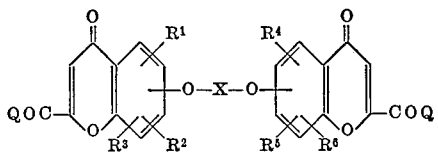

in which $R^1$, $R^2$, $R^3$, $R^4$, $R^5$ and $R^6$ are the same or different and each represent hydrogen, halogen, hydroxy, alkyl or alkoxy, or substituted alkyl or alkoxy, X is an optionally substituted, straight or branched hydrocarbon chain which may be interrupted by a carbocyclic or heterocyclic ring, or one or more oxygen atoms or carbonyl groups, and COQ is a basic amide or a basic ester group.

There are also described processes for making the compounds and anti-asthmatic compositions containing them.

The present invention relates to new chemical compounds, methods for their preparation and pharmaceutical compositions containing them.

According to our invention we provide compounds of Formula I,

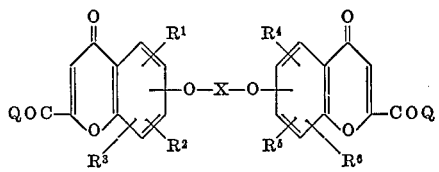

in which $R^1$, $R^2$, $R^3$, $R^4$, $R^5$ and $R^6$ are the same or different and each represent hydrogen, halogen, hydroxy, alkyl or alkoxy, or substituted alkyl or alkoxy, X is an optionally substituted, straight or branched hydrocarbon chain which may be interrupted by a carbocyclic or heterocyclic ring, or one or more oxygen atoms or carbonyl groups, Q is a group —ORNR'R" or a group —N($R^7$)RN$R^8R^9$, R is a divalent alkylene group, R' and R", which may be the same or different, are each hydrogen or alkyl, or R' and R", together with the adjacent nitrogen atom form a 5 or 6 membered nitrogen heterocyclic ring, $R^8$ and $R^9$, which may be the same or different, are each alkyl, or $R^8$ and $R^9$, together with the adjacent nitrogen atom form a 5 or 6 membered nitrogen heterocyclic ring, and $R^7$ is hydrogen, or alkyl, and pharmaceutically acceptable acid addition salts thereof.

According to our invention we also provide a process for the production of a compound of Formula I, which comprises reacting a compound of Formula II,

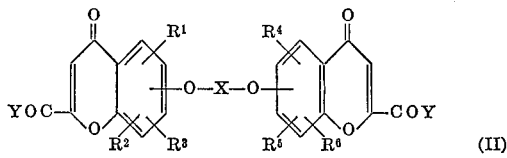

in which $R^1$, $R^2$, $R^3$, $R^4$, $R^5$, $R^6$ and X are as defined above, and (a) Y is halogen, or alkoxy with a compound of Formula III, $$HN(R^7)RNR^8R^9 \qquad (III)$$

in which R, $R^7$, $R^8$ and $R^9$ are as defined above, or (b) Y is halogen, alkoxy, or a group —OM, where M is hydrogen, or a reactive metal, with a compound of Formula IIIa, $$R''R'N-R-Z \qquad (IIIa)$$

in which R", R' and R are as defined above, and Z represents halogen when Y is a group —OM, or Z represents a group —OM when Y represents halogen, or alkoxy, and where desired or necessary converting the resulting compound to a pharmaceutically acceptable acid addition salt thereof.

The reaction of process (a) may be carried out in conventional manner. Thus when Y is halogen (preferably chlorine or bromine) the reaction is preferably carried out under anhydrous conditions preferably in the presence of an acid acceptor, e.g. a 100% excess of the compound of Formula III. When Y is an alkoxy group the reaction may, if desired, be carried out in the presence of a catalyst, e.g. dimethyl formamide.

In process (b), the reactive metal may be an alkali or alkaline earth metal, e.g. sodium potassium or calcium. When Y is a group —OM the reaction is conveniently carried out in a solvent, which is inert under the reaction conditions, for example chloroform, at ambient or an elevated temperature. When Y is halogen the reaction is preferably carried out under anhydrous conditions, suitably in the presence of an acid acceptor, e.g. an anhydrous alkali metal carbonate; alternatively an 100% excess of the compound of Formula IIIa may be used as acid acceptor. When Y is alkoxy the reaction may be carried out under conventional transesterification conditions. When either Y or Z represents halogen it is preferred that the halogen be chlorine or bromine.

Suitable pharmaceutically acceptable acid addition salts of the compound of Formula I include the hydrochloride, oxalate, citrate, tartrate, embonate, maleate and succinate. The pharmaceutically acceptable acid addition salts of the compounds of Formula I may be made by conventional methods, e.g. reacting the compound of Formula I with an appropriate acid.

The compounds of Formula I and their pharmaceutically acceptable acid addition salts may be formulated as pharmaceutical compositions and may be used for the same purpose and in the same manner as described in British patent specification No. 1,144,905. The compounds of Formula I and their pharmaceutically acceptable acid addition salts are of particular value for the above mentioned utility.

It is preferred that R is a divalent alkylene group containing from 1 to 4 carbon atoms, e.g. an ethylene or propylene group. When R' or R", or $R^8$ or $R^9$ are alkyl it is preferred that they contain from 1 to 4 carbon atoms and are, for example methyl or ethyl. When R' and R", or $R^8$ and $R^9$ together with the adjacent nitrogen atom form a heterocyclic ring the ring may be, for example a piperidino or a morpholino ring. $R^7$ may be an alkyl group containing from 1 to 4 carbon atoms.

$R^1$ to $R^6$ may be, for example, hydrogen, chlorine, bromine, hydroxy, alkyl, alkoxy, hydroxy-alkyl, or alkoxy-alkoxy, the alkyl and alkoxy groups containing from 1 to 6 carbon atoms. It is preferred that all of $R^1$ to $R^6$ are hydrogen.

X may be a saturated or unsaturated hydrocarbon chain or such a chain interrupted by one or more oxygen atoms or carbonyl groups or by a 5 or 6 membered carbocyclic or heterocyclic ring and may be substituted by a halogen atom (e.g. a chlorine or bromine atom) or by a hydroxy or alkoxy, C1 to 6 group. Specific examples of the group X are groups of formulae:

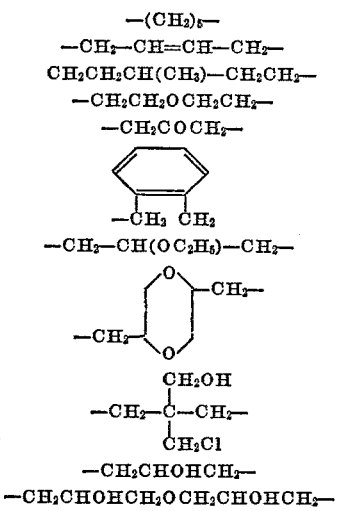

The group X may be a hydrocarbon chain containing from 3 to 7 carbon atoms, which may optionally be substituted by a hydroxy-group or which may be interrupted by one or more oxygen atoms. A particularly preferred chain is of formula —CH$_2$CHOHCH$_2$—. It is also preferred that the chain should join the 5 and 5' positions on the chromone nuclei.

The invention is illustrated, but in no way limited by the following examples in which the parts are by weight.

EXAMPLE 1

1,3-bis-(2-(2-diethylaminoethoxycarbonyl)chromon-5-yloxyl)propan-2-ol

To a solution of 4.1 parts of 2-diethylaminoethyl chloride in 100 parts of chloroform was added 4.68 parts of 1,3-bis-(2-carboxychromon-5-yloxy)propan-2-ol. The mixture was shaken for 2 hours at room temperature.

The mixture was then filtered and the filtrate was evaporated under vacuum to give a pale yellow semi-solid which was heated at 100° C. for 2 hours. The resulting solid was dissolved in chloroform and filtered. The addition of diethyl ether to the filtrate gave 0.4 part of 1,3-bis-(2-(2-diethylaminoethoxycarbonyl)chromon - 5-yloxy)propan-2-ol dihydrochloride dihydrate as a yellow solid.

*Analysis.*—Found (percent): C, 53.3; H, 5.96; N, 3.36. $C_{35}H_{42}N_2O_{11} \cdot 2HCl \cdot 2H_2O$ requires (percent): C, 54.2; H, 6.19; N, 3.61.

EXAMPLE 2

1,3-bis(2-(2-piperidinoethoxycarbonyl)chromon-5-yloxy)propan-2-ol

To a solution of 2-piperidinoethyl chloride (generated from 3.68 parts of 2-piperidinoethyl chloride hydrochloride) in 100 parts of chloroform was added 4.68 parts of 1,3-bis(2-carboxy-chromon-5-yloxy) propan-2-ol. The mixture was shaken for 12 hours at room temperature and filtered.

The filtrate was evaporated under vacuum to give an oil which was heated for 4 hours at 100° C. The resulting semisolid was extracted with chloroform and filtered. The chloroform extracts were evaporated to 100 ml. and to this solution diethyl ether was added. The solid which precipitated was filtered off and crystallized from ethanol to give 0.8 part of 1,3-bis(2-piperidinoethoxycarbonyl) chromon-5-yloxy)propan-2-ol dihydrochloride as a white solid.

*Analysis.*—Found (percent): C, 57.8; H, 5.56; N, 3.06. $C_{37}H_{42}N_2O_{11} \cdot 2HCl$ requires (percent): C, 58.2; H, 5.77; N, 3.67.

EXAMPLE 3

1,3-bis(2-N(2-dimethylaminoethyl)carboxamido-4-oxo-4H-1-benzopyran-5-yloxy)propan-2-ol dihydrochloride One part of 1,3-bis(2-carboxy-4-oxo-4H-1-benzopyran-5-yloxy)propan-2-ol was added slowly with stirring to a cooled solution of 1.6 parts of thionyl chloride in 9 parts by volume of N,N-dimethyl formamide. The resulting mixture was stirred as ambient temperature for 72 hours. To this solution was added with stirring and cooling, a solution of 1.4 parts by volume of N,N-dimethyl ethylene diamine in 10 parts by volume of N,N-dimethyl formamide. The resulting homogeneous solution was then stirred at ambient temperature for 3 hours. Addition of 80 parts of acetone gave a cream coloured, hygroscopic solid which was reprecipitated from its solution in N,N-dimethyl formamide with ethyl acetate to give 1,3-bis(2-N(2 - dimethylaminoethyl)carboxamido - 4 - oxo-4H-1-benzopyran-5-yloxy)propan-2-ol dihydrochloride as a buff, hygroscopic solid.

Spectral-confirmation

The I.R. spectrum (Nujol mull) contained a band centred at 1650 cm.$^{-1}$ due to the benzopyran ring carbonyl groups, and also bands at 1690 cm.$^{-1}$ and 1540 cm.$^{-1}$ due to the amide groups.

The N.M.R. spectrum (d$_6$-dimethylsulphoxide) included a sharp singlet at 3.4τ (equivalent to 2 protons) due to benzopyran ring 3-protons and another sharp singlet at 7.2τ (equivalent to 12 protons) due to the protons of the two

groups.

We claim:
1. A compound of Formula I,

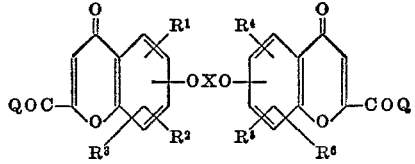

in which
$R^1$, $R^2$, $R^3$, $R^4$, $R^5$ and $R^6$ are the same or different and each represent hydrogen, halogen, hydroxy, alkyl, alkoxy, hydroxy-alkoxy or alkoxy-alkoxy, each alkyl and alkoxy group containing from 1 to 6 carbon atoms, X is a straight or branched hydrocarbon chain of 3 to 7 carbons which may be interrupted by a benzene ring, dioxanyl, an oxygen atom or a carbonyl group, and which may be substituted by a halogen, hydroxyl or alkoxy of 1 to 6 carbons, Q is a group —ORNR'R'' or a group

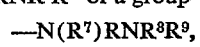

R is a divalent alkylene group containing from 1 to 4 carbon atoms,

R' and R", which may be the same or different, are each hydrogen or an alkyl having 1 to 4 carbons, or R' and R" together with the adjacent nitrogen atom form a piperidino or a morpholino ring, $R^8$ and $R^9$, which may be the same or different, are each alkyl having 1 to 4 carbons, or $R^8$ and $R^9$ together with the adjacent nitrogen atom form a piperidino or morpholino ring, and $R^7$ is hydrogen, or alkyl having 1 to 4 carbons.

2. A compound according to claim 1, wherein $R^1$ to $R^6$ are hydrogen, chlorine, bromine, hydroxy, alkyl, alkoxy, hydroxy-alkoxy, or alkoxy-alkoxy, the alkyl and alkoxy groups containing from 1 to 6 carbon atoms.

3. A compound according to claim 1, wherein $R^1$ to $R^6$ are all hydrogen.

4. A compound according to claim 1, wherein X is a hydrocarbon chain containing from 3 to 7 carbon atoms, which may optionally be substituted by a hydroxy group or which may be interrupted by one or more oxygen atoms.

5. A compound according to claim 1, which is 1,3-bis-(2-(2-diethylaminoethoxycarbonyl)chromon - 5 - yloxyl)propan-2-ol.

6. A compound according to claim 1, which is 1,3-bis-(2-(2-piperidinoethoxycarbonyl)chromon - 5 - yloxy)propan-2-ol.

7. A compound according to claim 1, which is 1,3-bis-(2 - N(2 - dimethylaminoethyl)carboxamido-4-oxo-4H-1-benzopyran-5-yloxy)propan-2-ol.

8. A compound according to claim 1 in the form of a pharmaceutically acceptable acid addition salt thereof.

References Cited
UNITED STATES PATENTS

| | | | |
|---|---|---|---|
| 3,673,218 | 6/1972 | Cairns et al. | 260—345.2 |
| 3,720,690 | 3/1973 | King et al. | 260—345.2 |

ALAN L. ROTMAN, Primary Examiner

G. T. TODD, Assistant Examiner

U.S. Cl. X.R.

260—240 R, 246 B, 247.2 A, 247.2 B, 340.6, 345.1, 999